Aug. 14, 1951     H. R. WILSON     2,564,350
MACHINE TOOL
Filed Dec. 3, 1946     4 Sheets-Sheet 1
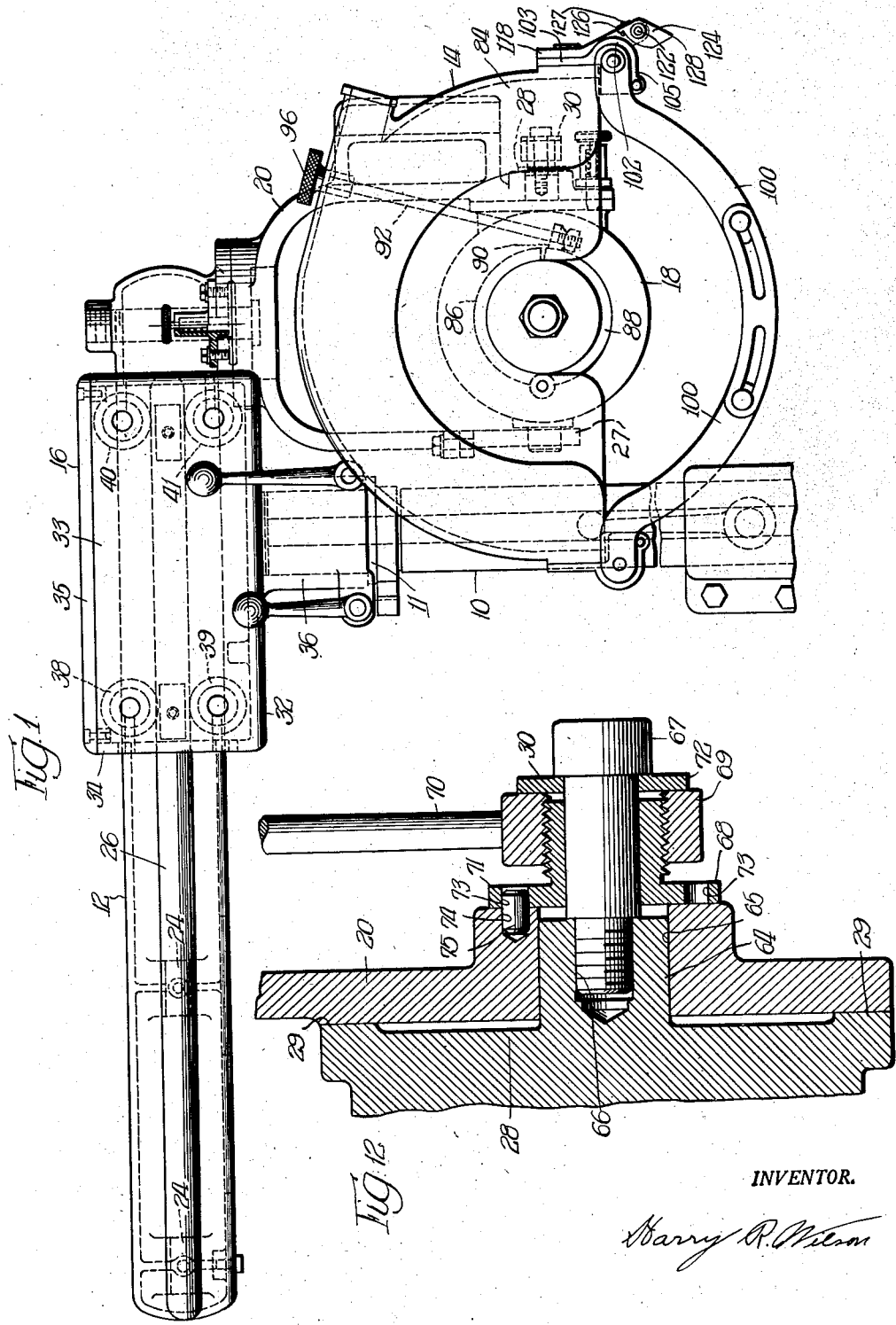
INVENTOR.
Harry R. Wilson

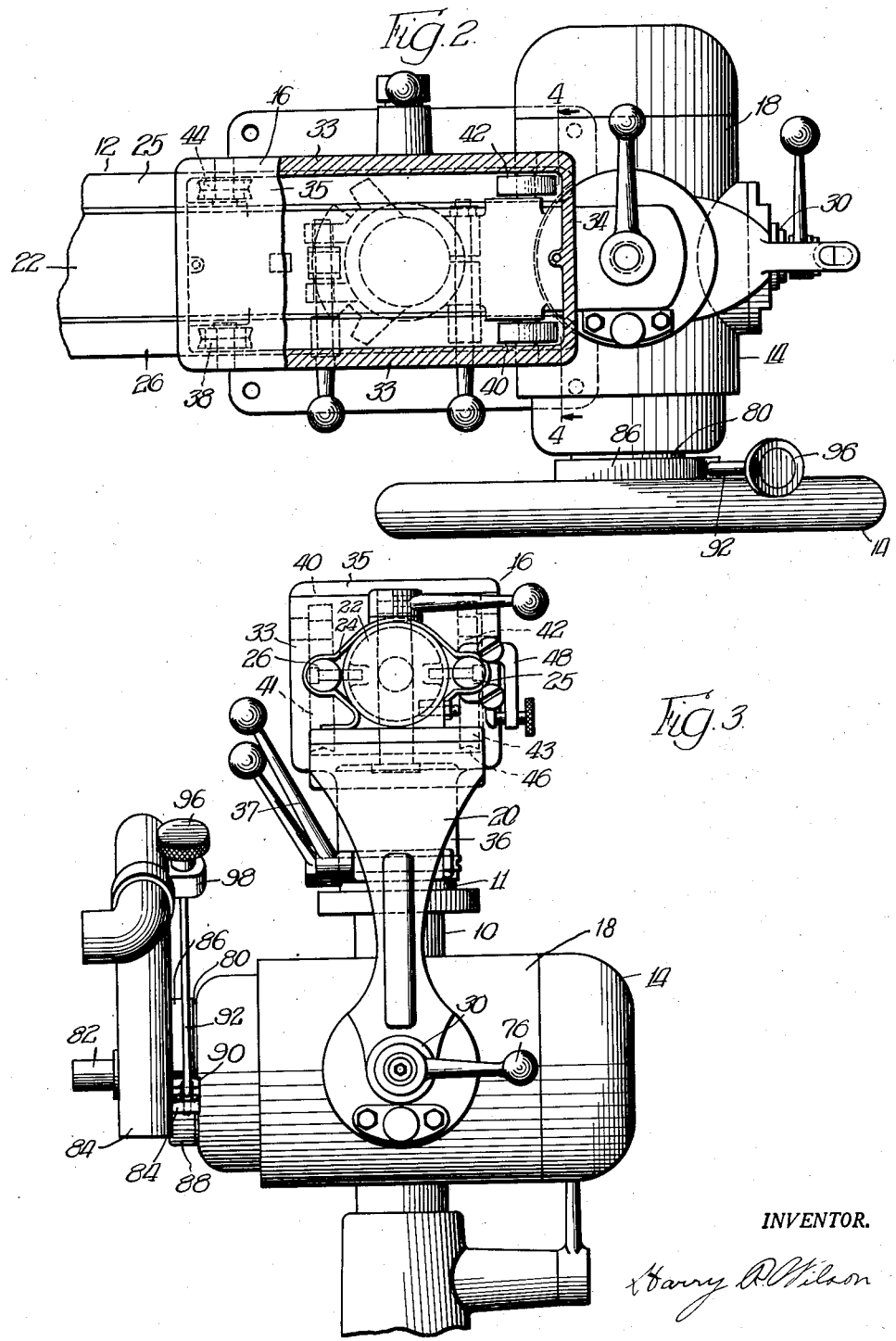

Aug. 14, 1951 H. R. WILSON 2,564,350
MACHINE TOOL
Filed Dec. 3, 1946 4 Sheets-Sheet 3
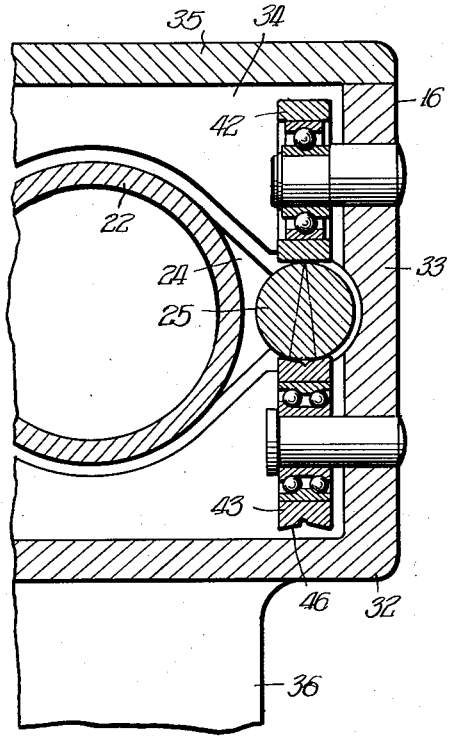
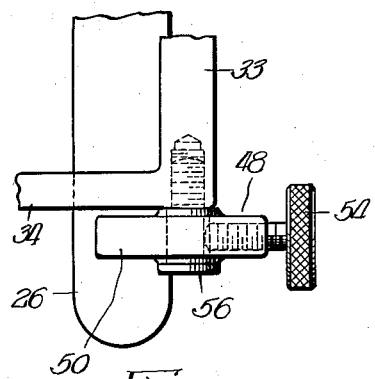
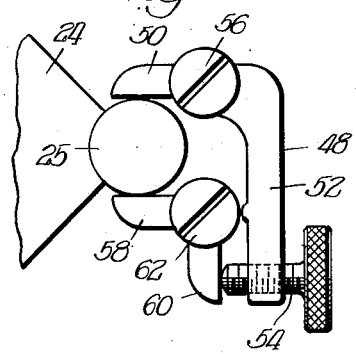
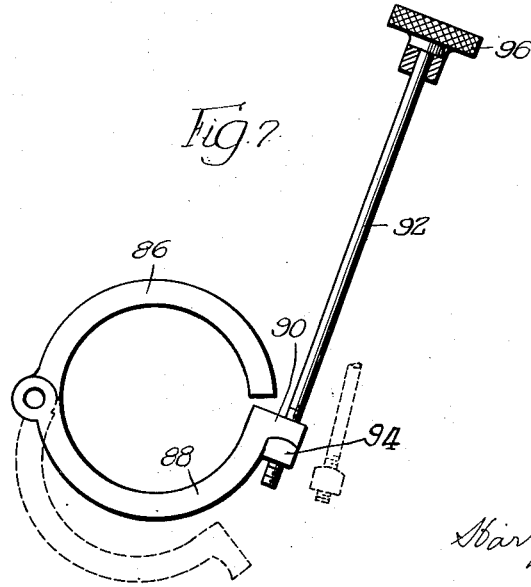
INVENTOR.
Harry R. Wilson Aug. 14, 1951       H. R. WILSON       2,564,350
MACHINE TOOL
Filed Dec. 3, 1946       4 Sheets-Sheet 4
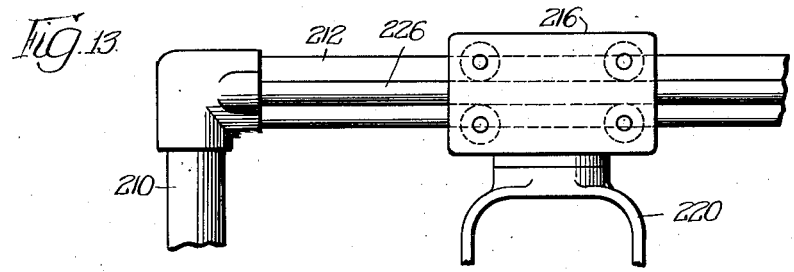
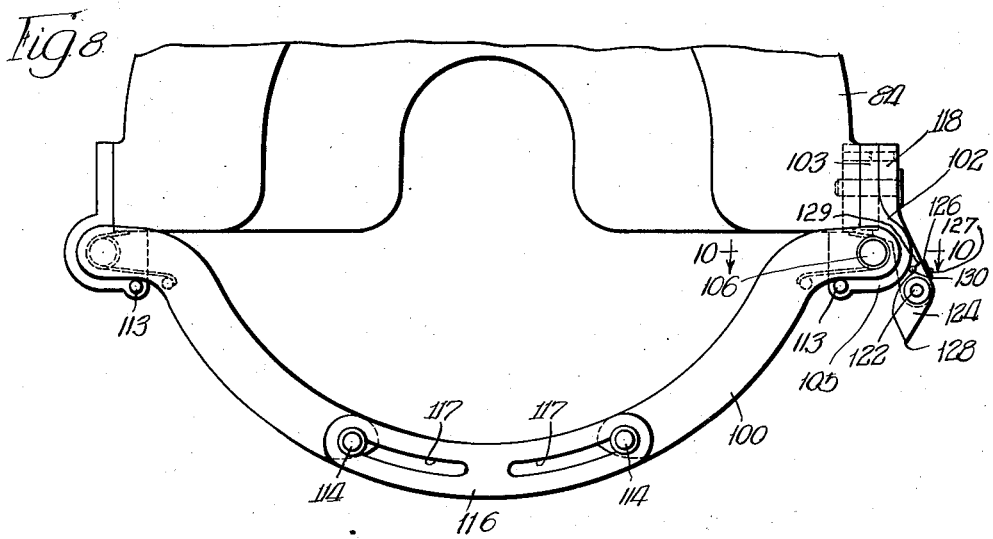
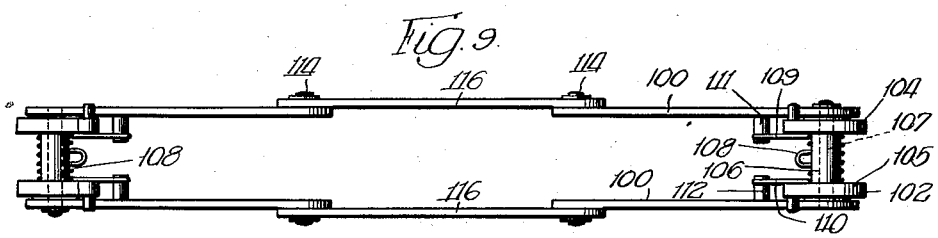
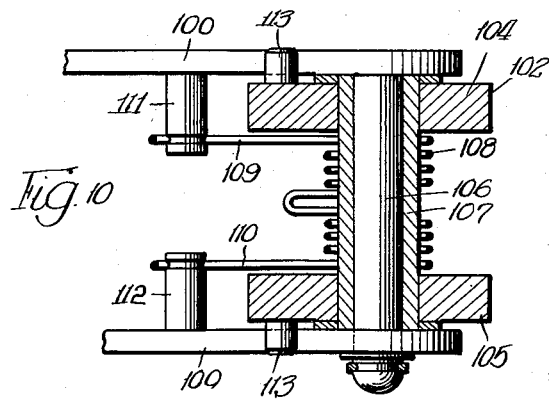
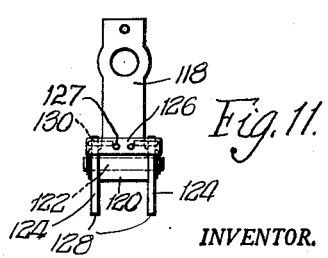
INVENTOR.
Harry R. Wilson Patented Aug. 14, 1951

2,564,350

UNITED STATES PATENT OFFICE 2,564,350

MACHINE TOOL

Harry R. Wilson, Waterloo, Iowa, assignor, by mesne assignments, to Skilsaw, Inc., Chicago, Ill., a corporation of Delaware Application December 3, 1946, Serial No. 713,615

3 Claims. (Cl. 308—6)

The present invention relates to improvements in a machine tool, and more particularly to a machine tool of the radial saw type.

Machines of this type have been manufactured and sold heretofore for various woodworking and metal cutting applications. By changing the cutting tool, and with proper adjustment, such numerous operations can be performed that the machines have been sold and used as having practically the facilities of a complete woodworking shop. With a saw blade an operator can rip, crosscut or mitre. Dadoing, gaining, ploughing, beveling, fluting, grooving may be performed by other cutting tools while still others will permit routing, shaping, coping and cut-off and tenoning. Because of their versatility they are in great demand today especially for the tremendous amount of home and factory construction now being undertaken.

Normally the arm of the operator is used to move the work unit back and forth across the work so there is still fatigue involved in the operation of this type of machine although the output of the operator is tremendously increased. The various adjustments of the present machines are not too easily reached nor quickly made without time and energy consuming manipulations and the possibility that the machine may be mechanically forced out of accurate alignment. There are certain inherent dangers in operating any tool. Safety guards commonly are thought of as a nuisance and are not used by the worker for his protection, or are removed by him because they partially block good visibility of the work and add friction to hand operation as they drag over or impinge upon the work. When ripping with a tool of the present type in green wood or if a knot is struck, the piece of wood may tend to be kicked or thrown violently from the work unit. Various anti-kick back arrangements have been tried without too successful solution.

One of the objects of the present invention is to provide a radial machine of this type that is less burdensome to operate.

Another object is to provide a machine that may be adjusted for its various operations in a quick and easy manner and cannot be forced out of proper alignment while making the adjustments.

A further object is to provide a machine with safety features that will not interfere with the normal operation of the machine and will act affirmatively to protect the operator.

Yet another object of the invention is to provide a relatively inexpensive but accurate machine for precision operation that may be easily manipulated or set up and yet be rugged, safe and stand severe handling by inexperienced operators.

Various other objects of this invention will be pointed out hereinafter with reference to the drawings wherein an exemplification of an embodiment of the invention is set forth.

In the drawings:

Fig. 1 is a view in side elevation of one embodiment of the invention with the base and legs not shown as they are well known and form no part of the present invention.

Fig. 2 is a view in top plan of a portion of this embodiment with a portion of the housing broken away.

Fig. 3 is a view in front elevation of this embodiment.

Fig. 4 is a view in section of a fragment taken on the line 4—4 of Fig. 2.

Figs. 5 and 6 are views in top plan and front elevation respectively of an improved rip lock.

Fig. 7 is a fragmentary view of the upper saw guard locking means.

Fig. 8 is a view of the lower saw guard and rip guard and their attachment to the upper saw guard which is shown broken away.

Fig. 9 is a bottom plan view of Fig. 8.

Fig. 10 is an enlarged fragmentary view of the right end portion of Fig. 9.

Fig. 11 is a view in front elevation of the rip guard.

Fig. 12 is an enlarged fragmentary view in section through the motor housing, yoke and journal lock.

Fig. 13 is a view in side elevation of a fragment of another embodiment of the invention.

As exemplified herein and for simplicity, the invention is disclosed in connection with a work unit embodying a saw blade. Tools of this type normally include a work bench (not shown) an upright supporting member or column and an arm extending radially from the column over the work bench. A work unit is normally associated with the arm and a carrying member is provided so that the work unit may be moved backwards and forwards across the bench in the direction of the length of the arm and radially to and from the supporting member by hand operation. In some embodiments the arm itself is slidable in the carrying member with respect to the column while in others the unit is slidable with the carrying member along the arm or a track on the arm to obtain the desired results.

For precision adjustments these parts are built from relatively heavy, rugged materials such as iron castings and steel rods or bars which means that an operator must overcome a large amount of initial inertia in even the simple operation of cross cutting a board. Prior machines have tried to overcome this by the use of bearing rollers running on flat tracks but guide means were necessarily added to keep the work unit in alignment creating additional friction or the wheels or rollers were mounted at various angles to each other on angularly disposed tracks requiring extra machining, expense and difficult assembly.

In a preceding Patent No. 2,291,999, in which applicant was a joint inventor, rails having a rectangular cross section were used to form a V-shaped track and bearing rollers having V-shaped annular grooves were used to interfit over this track to hold the carrying member in proper alignment. Friction was not entirely overcome however as the outer portion of the grooved rollers travelled faster than the inner portion and some portion of the grooved rollers necessarily was dragged along the track.

In the present invention this problem is overcome by causing the rollers and track to be so constructed and arranged as to afford only line contact between them in lines extending longitudinally of the arm. The rollers may be so arranged that the line contact may form a generally triangular pattern between opposed rollers adding strength, rigidity and assuring alignment at all times without additional rails, guides or wheels. This may be accomplished by having the rollers meet the track in a generally tangential manner.

For low cost production, a saving of time in making adjustments and setting up the tool for a new operation is essential since this manipulation is non-productive work. The present invention incorporates improvements in adjusting means to provide quick, easy adjustment of the work unit and the upper saw guard.

The lower safety guard includes a series of links on either side of the saw blade that offer little resistance to a work piece as the work unit is moved over it and constantly moves in front of the blade to warn a careless operator of the approach of the blade. Since it is mounted on either side of the blade, the operator has a constant view of the work and cutting line. The links on one side of the blade operate independently of the links on the other side, as in a mitre or bevel cut, to constantly protect the operator. With former guards, a bevel or mitre cut might protect the operator from one side only, leaving the blade entirely exposed on the other.

When ripping, the upper saw guard normally is swung around so that it just clears the work piece. The action of the blade picks up the saw dust and carries it out an exhaust opening in the guard to free the work of this dust. As anti-kick back attachment may be mounted on the upper guard at a point where it will yieldingly drag over the work piece as it is fed through the blade and will positively dig into the work piece and prevent it from being thrown or kicked from the machine by the blade should the latter strike a knot in the wood or a too green section.

With reference to the drawings there is shown an upright member 10 to which is mounted a radial arm 12 and work unit 14. A carrying member 16 permits the work unit 14 to be moved backward and forward in the direction of the length of the arm 12 and toward and away from the upright supporting member 10. The upright member is suitably mounted to any well known work table (not shown) whereby a work piece may be brought into proper position for a cutting operation by the work unit.

As is customary in machines of this type, the arm 12 may be mounted to the upright for horizontal swinging movement through 360°; the work unit may be suspended for a horizontal pivot of 360° and the motor unit 18 may be suitably mounted in its yoke 20 for a vertical rotation through 360° giving a great amount of flexibility to the adjustments of the machine for various operations.

With reference to Figs. 1, 3 and 4 it will be seen that the arm 12 includes a casting 22, generally cylindrical in cross section with spaced bosses 24—24 on diametrically opposite sides which may be accurately machined to receive the rods or tracks 25 and 26.

At its forward end the casting 22 is provided with a suitable mounting to pivotally receive a yoke 20 in which is journaled a motor 18 through bearing members 27, 28. The housing for the motor may be provided with a raised annular rib 29 (Fig. 12), which engages the inner surface of the yoke 20 upon proper application of the lever mechanism 30 frictionally to hold the motor assembly in a predetermined position.

In the embodiment of Fig. 1 the carrying member is pivotally mounted to the upright member 10 and includes an elongated housing having a bottom portion 32, side members 33 and end members 34 formed to receive the radial arm 12 with its side rails 25, 26. Preferably there is a removable top 35 for the housing. A depending collar 36 may be cast integrally with the bottom 32 to fit over the upright member 10 and rest upon a fixed collar 11 thereon so that the arm 12 and its work unit 14 may be swung radially of the member 10. A suitable clamping member 37 may be mounted with respect to collar 36 and the upright to hold the arm 12 in a predetermined position.

The arm 12 is mounted within the carrying housing member 16 through means of pairs of oppositely disposed bearing rollers in rolling engagement with the cylindrical tracks 25, 26. These bearing rollers are rotatively mounted in the side walls 33 and extend over in line contact and alignment with the track longitudinally of the arm 12. Toward the rear of the housing one pair of oppositely disposed bearing rollers 38 and 39 are shown so constructed and arranged with respect to track 25 while at the forward end of and at the same side of the housing, bearing rollers 41 and 40 are similarly arranged with respect to said track.

Diametrically opposite (Figs. 2, 3, 4) to these pairs are roller pairs 42, 43 and 44, 45 correspondingly arranged with respect to track 26. The upper wheels in the rear 38, and 44 may have a V-shaped rim surface 46 while their respective opposites 39, 45 may have a substantially cylindrical rim or surface. Conversely the lower rollers in the forward part may have a V-shaped surface 46 while their respective opposites 40 and 42 may have a cylindrical rim surface. Thus the V-shaped surfaces bear the weight of and guide the arm as it and the work unit are pulled outwardly from the upright 10 while the cylindrical bearing rollers hold the arm in proper position.

As may be seen in Fig. 4, the result is that the bearing rollers 42, 43 meet the track in a substantially tangential contact with a V-shaped roller arranged in opposition to a cylindrical roller whereby to afford line contact between rod 26 and the rollers along a plurality of lines extending longitudinally of the arm and arranged in a generally triangular pattern A. The arm and its track cannot rotate, rock nor twist in this mounting with a proper alignment of the rollers. Were cylindrical rollers arranged in position to each other the arm and track might slip sideways in the mounting unless further guide means were interposed. The V-shaped wheels furnish this guideway without its added friction and retains the line contact.

To the front of the carrying member 16 may be mounted a rip lock, generally designated at 48 (Figs. 3, 5 and 6), to hold the work unit 14 spaced at a predetermined interval from the upright member 10. As shown, this rip lock includes an upper member generally V-shaped with one leg forming a jaw member 50 and with an elongated fulcrum leg 52 and having a screw threaded aperture at its outer end to receive a threaded clamping thumb screw 54. This upper member is freely pivoted along its jaw leg 50 as at 56 so that the jaw overlies the track rod 26. The weight of the fulcrum leg and its screw 54 tend to swing the jaw 50 upwardly. A lower member, likewise generally V-shaped, may have a jaw leg 58 and a clamping leg 60 and be freely and pivotally mounted through its apex as at 62 in a spaced but nested relation with the upper member so that its jaw member underlies the rod 26 and the clamping leg 60 is adjacent the fulcrum leg 52 and its clamping member 54. Jaw 58 tends to swing downwardly from rod 26 from force of gravity bringing leg 60 into contact with the inner end of screw 54.

Upon tightening screw 54, one of these jaw members may come into contact with rod 26 prior to the other. Further tightening brings the other jaw member into an equalized grip upon the track 26 that cannot distort nor misalign the track or its arm and does not mar or scratch the finish. It also forms a quickly operated lock at any predetermined point along the track.

The lever mechanism 30 (Fig. 12) provides a speedy adjustment for the work unit. Since it normally is used more than any other adjustment it tends to wear more rapidly and the operating handle, through wear, may at times interfere with the work piece or the vision of the operator. This mechanism provides means for providing for such wear so that the operating handle may always be positioned for immediate use but away from interference with the work being performed.

Trunnion 28 includes a journal member 64 received within a bearing aperture 65 in yoke 20. The journal has an interiorly threaded aperture 66 to receive a stripper or clamping bolt 67. Upon its inner portion, bolt 67 is threaded to be received in aperture 66. Centrally this bolt has an enlarged cylindrical surface shouldered against the outer end of journal 64 and an enlarged clamping head. In effect this bolt forms a continuation of journal member 64, which, except for ease of machining and assembly, might be formed in this manner with slight changes. Mounted over the cylindrical surface of this bolt and abutting the yoke bearing member is a locking bushing 68 externally threaded (left handed) to receive correspondingly internally threaded handle collar 69 having an operating handle 70 formed as a part thereof. A locking washer 72 is mounted over the stripper bolt between its head and the end of the locking bushing and is adapted to abut against the handle collar 69 and the head of the bolt.

A flanged portion 71 of bushing 68 may have peripheral openings 73 formed therein and the yoke bearing member abutting said flange may have an adjustment opening 74 therein carrying a dowel pin 75 so that bushing 68 may be adjusted to and held in a plurality of positions around its mounting over bolt 67 forming means for locking said bushing to the bearing member against rotation.

In assembly, washer 72 is slid over bolt 67 and against its head. Collar member 69 is partially screwed over bushing 68 and the bushing slid over the bolt 67 so that the collar abuts the washer 72. Bolt 67 is now screwed into aperture 66 until the cylindrical portion abuts the outer end of journal 64. Bushing 68 is now turned to a desired adjusted position and locked in place by means of a dowel pin 75 in an aperture 73 so that handle member 70 is out of the way of the operator and the work, as for instance as shown in Fig. 3.

Upon rotating handle 70 clockwise, it presses against washer 67 and the head of bolt 67 because of its left hand thread, pulling journal 64 into the yoke bearing opening 65 until the annular rib 29 is in tight frictional contact with yoke 20. A slight counter clockwise movement of handle 70 loosens the assembly so that the trunnions and the work unit are freed for rotation. Should the parts wear so that handle 70 hangs downwardly in the way of an operator's vision, bushing 68 may be turned so that a new opening 73 is presented to dowel pin 75 and the handle 70 brought back to a desired position.

With reference to Fig. 3 it will be noted that the motor housing 18 has an end bell or protecting shell 80 through which extends the driven shaft or arbor 82. Upon this end bell is mounted an upper saw guard 84 of the usual arcuate shape, by means of a split saw guard collar having the integral upper collar member 86 (Fig. 7) and a lower collar member 88 hinged at one end to an end of the upper collar member. The free end of the lower collar member is flanged outwardly as at 90 and is slotted to receive a clamping rod 92. The under side of flange 90 adjacent the slot may be concave to receive the convex portion of a clamping nut 94 screwed up over the threaded lower end of rod 92 in a concavo-convex relationship.

At its upper end rod 92 carries a large thumb knob 96 and fits loosely within and is suspended from a retaining ring 98 (Fig. 3) suitably mounted to the upper portion of guard 84. Preferably the parts are so mounted that rod 92 may be fitted into slotted flange 90 at a slight angle to the vertical and be held therein by clamping nut 94. A straight turn of knob 96 permits collar 88 to loosen from a clamped position on end bell 80 so that the guard may be rotated to any desired position thereon. Nut 94, because if its concavo-convex interfit with flange 90 may be slightly loosened without having rod 92 drop out of its slot. A further turn permits the rod to drop out of the slot when the interfit is broken and the entire guard may be removed quickly and easily.

A lower safety guard for a saw blade assembly is shown in Figs. 1, 8, 9 and 10. Generally this guard includes a plurality of links hingedly mounted or articulated to each other and to the upper guard and so arranged and constructed as to hang alongside of and below the lower edge of a circular saw blade to protect an operator's hand from a rotating blade. The links are designed to yield progressively as the blade is moved through a work piece and to be positively returned to normal full guard positions as the blade emerges therefrom.

The end links 100 are semi-circular for most of their length to conform to the periphery of a saw blade but are curved outwardly at their outer ends to be pivotally mounted in a bracket member 102. This bracket comprises a flat plate portion 103 mounted to the upper saw guard and has two depending ears 104 and 105 apertured to receive a hinge pin 106 and its spacer sleeve 107 suitably mounted therein. The outwardly curved portions of the end links are mounted over the hinge pin and spaced from each other by the sleeve 107. Over the sleeve 107 a spring member 108 may be mounted having free ends 109 and 110 in operative pressing contact with spring studs 111 and 112 respectively mounted on links 100 for that purpose. Ear members 104 and 105 have stop members 113 to prevent the links from being forced out of operative guard position by spring means 108.

At the inner end of each link 100 is mounted a center link pin 114. A center link member 116, arcuate in shape and following the general curvature of the saw blade, is slotted as shown at 117 and is mounted over the pin 114 and suitably held in place for articulated movement between the links. In operation, as work unit 14 is advanced to cut a work piece, a portion of an advance link 100 will strike the work piece and be pivoted inwardly and upwardly around the hinge member 106. At the same time the central link member will be bent upwardly and inwardly around its rear pin and slot arrangement while the forward slot 117 will allow its pin 114 to slide therein permitting this movement. As the center link passes over the work piece the rear pin and slot arrangement will permit the central and rear links to slide smoothly over the work piece without dragging thereon. Due to its curved formation, the lower guard will touch or contact the work piece substantially tangentially or at only one point at a time instead of throughout a substantial portion of the work piece.

As the lower guard passes beyond the work piece, springs 108 return the links to the normal guard position.

A rip safety guard may be attached to the upper saw guard over the lower guard plate 103 (Fig. 8) and as shown includes a guard bracket 118 which may be positioned between ears 104 and suitably attached through plate 103 into the upper saw guard 84. It may be slanted rearwardly to clear the hinge member 106 and have an enlarged lower portion 120 which may be bored or drilled to receive a hinge pin 122. Ratchet members 124 are pivotally mounted over the hinge pin on either side of the enlarged portion 120 and are yieldingly held in operative position by a flat spring member 126 that is mounted on the bracket as at 127 and overlies the ratchet members. The latter terminate in teeth portions 128 adapted to yieldingly slide over a work piece as it passes beneath in one direction and which will dig in and positively hold the work piece against movement in a reverse direction should the saw blade strike a knot or green portion. A stop member 129 may be formed on the ratchet member and a stop stud 130 mounted on guard bracket 118 to hold the teeth in a positive guard position upon a reversal of the work piece.

In practice, the upper saw guard is rotated around its collar 86 until the teeth 128 are slightly more than in contact with a work piece. As the latter is fed beneath the saw from right to left in Fig. 8, the teeth will yield and permit this movement. A reverse movement will cause the teeth to dig in to the work piece due to the action of stop member 129 and stud 130 and hold the piece from being kicked or thrown from the saw.

In Fig. 13 a modification of the invention is shown wherein the upright member 210 supports the radial arm 212 rotatively but the latter is held against longitudinal movement. Instead the carrying member 216 may be mounted to roll along track 226 and be suitably mounted on arm 212 by means of roller bearing mountings similar to those described for Fig. 1. A yoke 220 may be pivotally mounted to carry member 216 to hold a work unit as heretofore described so that the work unit may be moved radially toward and away from the upright member by means of the carrying member in either embodiment of the invention.

Other similar modifications of the invention will be apparent to those skilled in the art from an understanding of the specifications and drawings appearing herein without departing from the spirit or scope of the invention.

I claim:

1. In a radial saw of the type characterized by an upright supporting member, an arm carried by and extending radially with respect to said member, a work unit, and a unit carrying member connected with said unit and arm, of means for adjusting said unit toward and away from said upright supporting member in the direction of the length of said arm, said means including a plurality of rods of substantially circular cross section secured to and extending longitudinally of said arm at opposite sides of the same to form a double track, and a plurality of sets of oppositely disposed rollers of generally V-shaped and generally cylindrical surface formation carried by said supporting member in engagement with said track, with the V-shaped rollers arranged in opposition to the cylindrical rollers, whereby to afford line contact between the rods and rollers along a plurality of lines extending longitudinally of the arm and arranged in a generally triangular pattern.

2. A radial saw as defined in claim 1 wherein the V-shaped rollers are disposed to bear the weight of the arm and work unit in adjusting the same toward and away from the supporting member.

3. In a radial saw of the type characterized by an upright supporting member, an arm carried by and extending radially with respect to said member, a work unit, and a unit carrying member connected with said unit and arm, of means for adjusting said unit toward and away from said upright supporting member in the direction of the length of said arm, said means including a plurality of rods of substantially circular cross-section secured to and extending longitudinally of said arm at opposite sides of the same to form a double track, and oppositely disposed rollers carried by said supporting member in engagement with each track, some of said rollers being of generally cylindrical surface formation and at least one of said rollers being generally V-shaped, whereby to afford line contact between the rods and opposed rollers along a plurality of lines extending longitudinally of the arm.

HARRY R. WILSON.

REFERENCES CITED

The following references are of record in the file of this patent:

UNITED STATES PATENTS

| Number | Name | Date |
|---|---|---|
| 1,256,748 | Von Post | Feb. 19, 1918 |
| 1,528,536 | De Walt | Mar. 3, 1925 |
| 1,846,641 | Hedgpeth | Feb. 23, 1932 |
| 1,867,275 | McCarter | July 12, 1932 |
| 1,888,679 | Knapp | Nov. 22, 1932 |
| 2,083,682 | Balsiger et al. | June 15, 1937 |
| 2,230,744 | Disbro | Feb. 4, 1941 |
| 2,257,459 | Gardner | Sept. 30, 1941 |
| 2,291,999 | Wilson et al. | Aug. 4, 1942 |
| 2,312,356 | Ocenasek | Mar. 2, 1943 |
| 2,343,243 | Roemer | Mar. 7, 1944 |
| 2,353,088 | Schutz | July 4, 1944 |

FOREIGN PATENTS

| Number | Country | Date |
|---|---|---|
| 21,328 | Great Britain | Oct. 11, 1898 |
| 363,813 | Great Britain | Dec. 31, 1931 |
| 113,430 | Australia | July 3, 1941 |